July 21, 1931. H. WILLSHAW ET AL 1,815,085
APPARATUS FOR VULCANIZING TIRES
Filed March 15, 1928 6 Sheets-Sheet 1
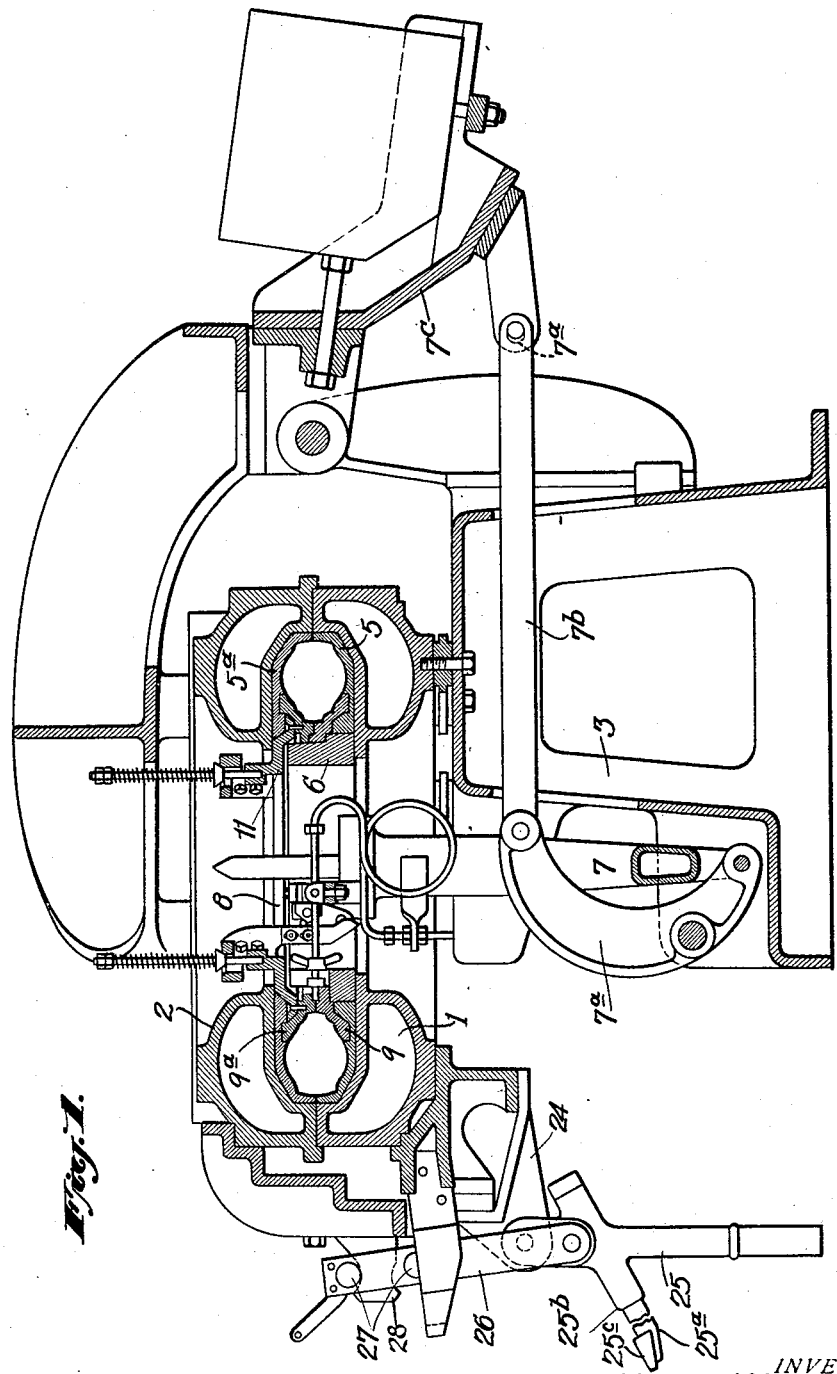
INVENTORS
HARRY WILLSHAW.
THOMAS NORCROSS.
BY FREDERICK GEORGE BROADBENT.
ATTORNEY

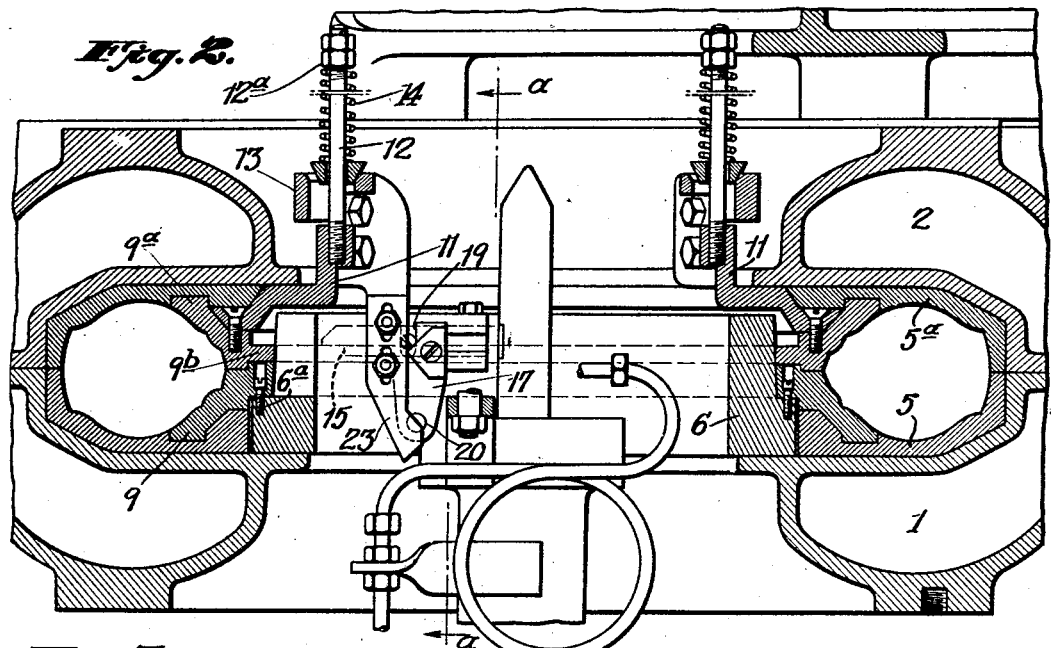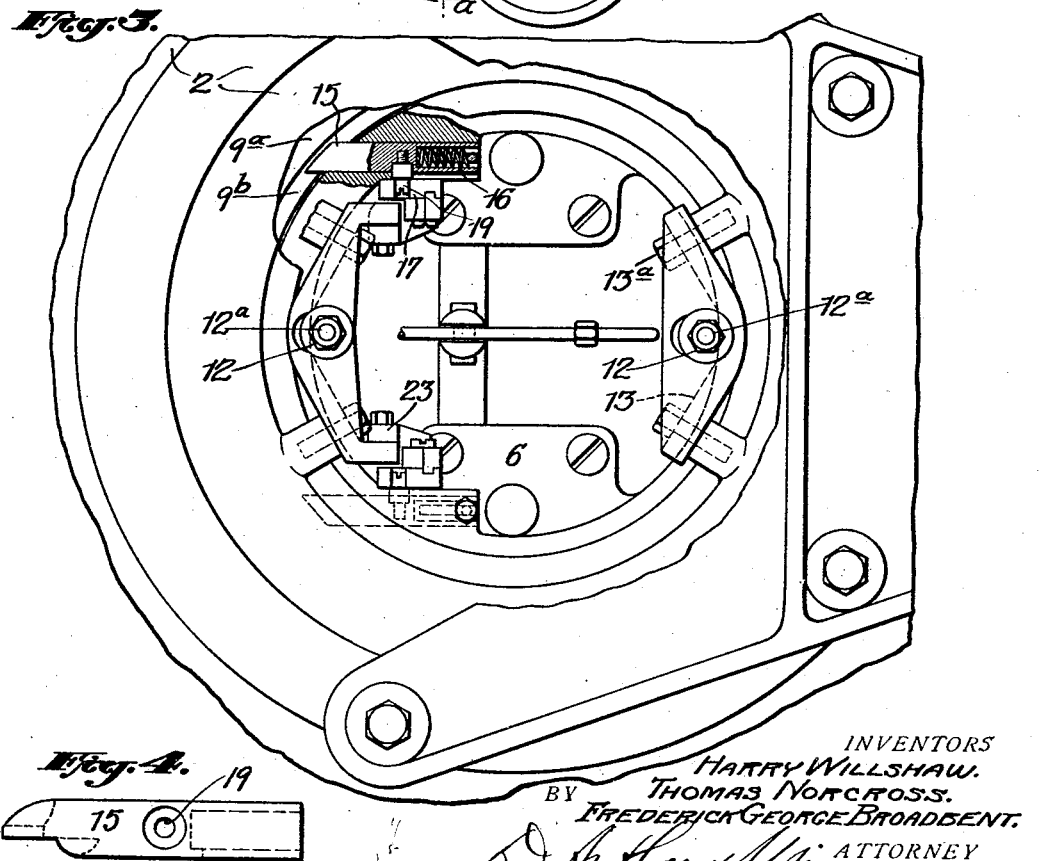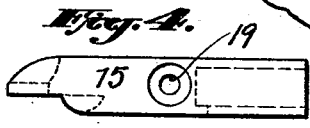

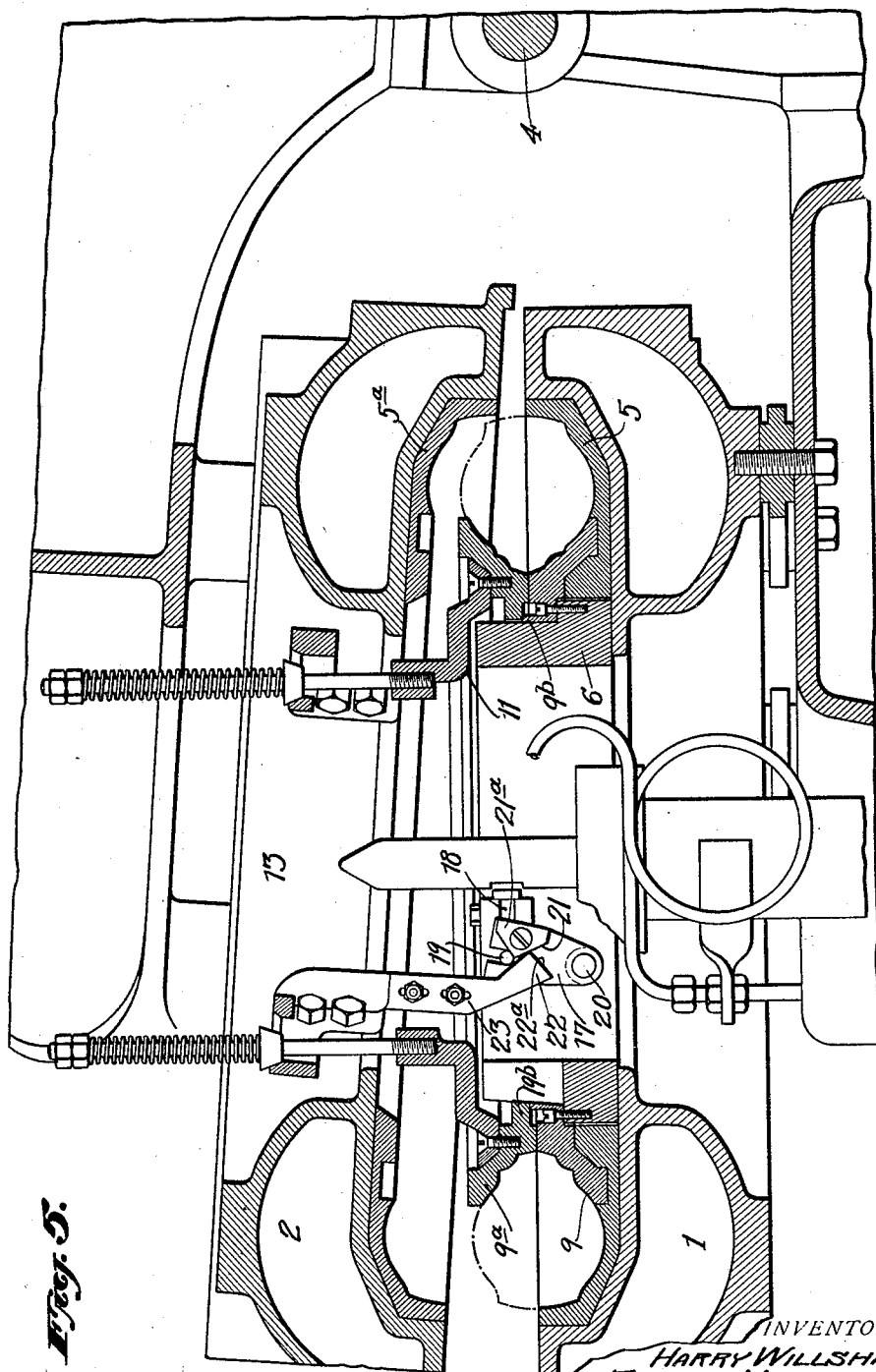

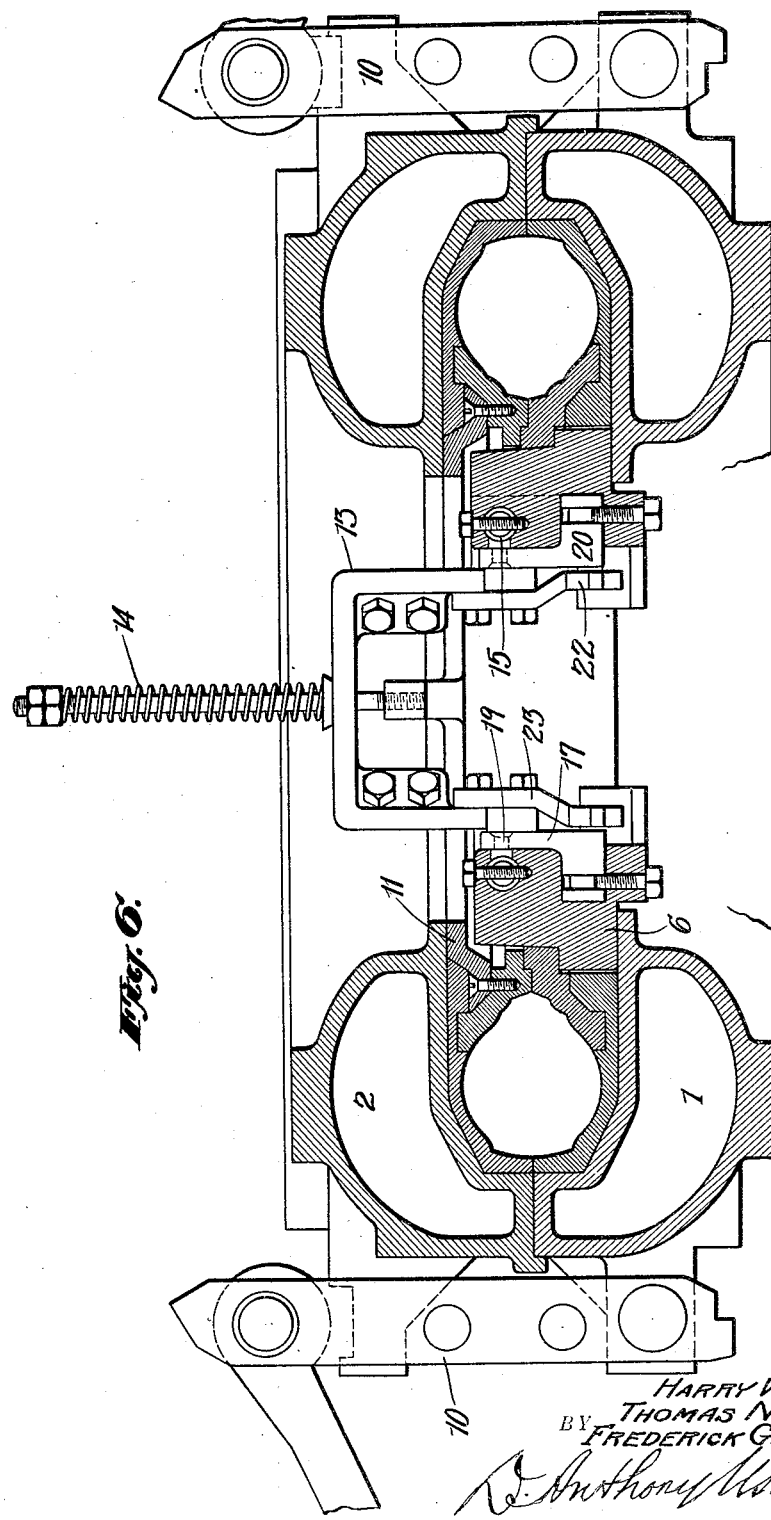

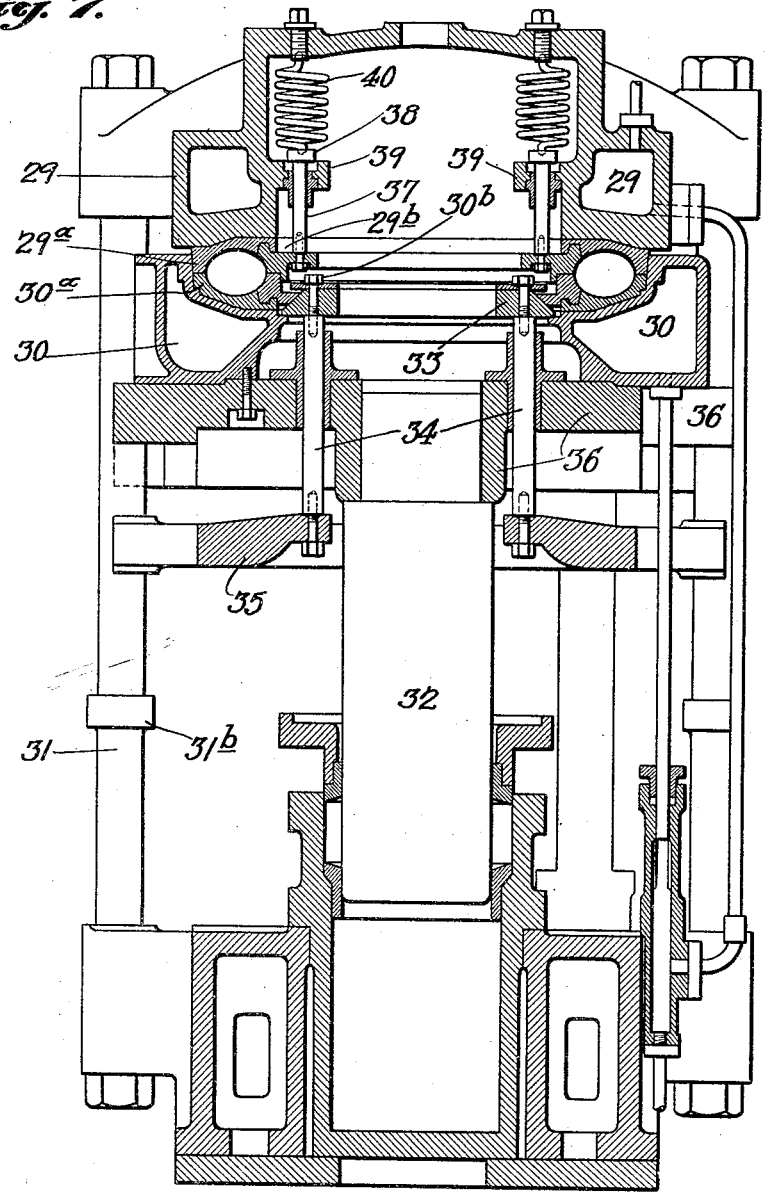

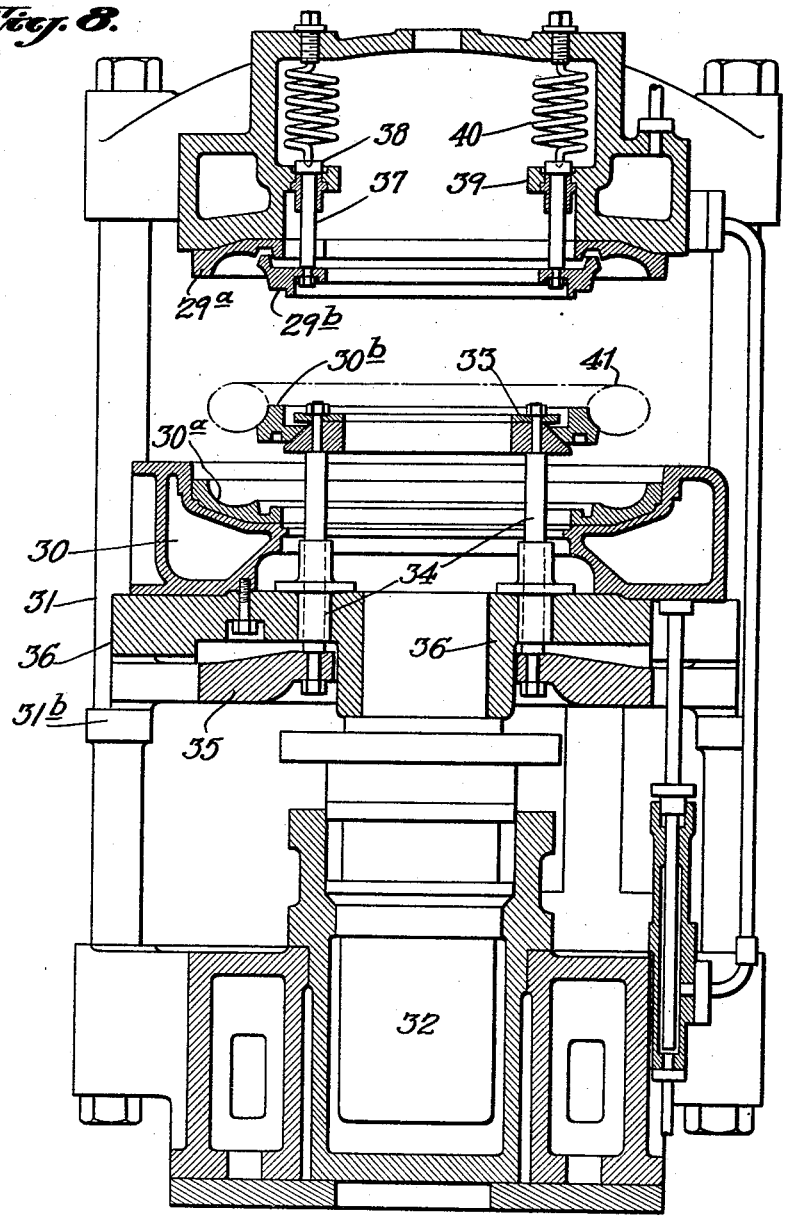

Patented July 21, 1931

1,815,085

UNITED STATES PATENT OFFICE

HARRY WILLSHAW, THOMAS NORCROSS, AND FREDERICK GEORGE BROADBENT, OF ERDINGTON, ENGLAND, ASSIGNORS TO DUNLOP TIRE AND RUBBER CORPORATION, OF BUFFALO, NEW YORK, A CORPORATION OF NEW YORK

APPARATUS FOR VULCANIZING TIRES

Application filed March 15, 1928, Serial No. 261,762, and in Great Britain March 19, 1927.

This invention relates to apparatus for molding and vulcanizing with internal pressure the outer covers of pneumatic tires, inflatable tubes and the like, of the kind which includes annular steam chests adapted to embrace the respective halves of the tire or the like mold, and particularly to apparatus wherein the said chests are hinged relative to each other.

Hitherto the process, and the prior preparatory steps thereof, of loading the apparatus with a raw case has been somewhat arduous and prolonged. In practice the procedure has been to assemble the raw case, containing an airbag, upon the clip rings at a place apart from the molding apparatus. Among the disadvantages of such a procedure may be mentioned the comparatively elaborate and costly "clipping-up" operation, whereby the clip rings are forced together usually by hydraulic pressure, so as to embrace tightly the bead portions of the tire. Then again, there is a considerable amount of arduous handling and transportation of the comparatively heavy clip rings; which, incidentally, damages the clip rings considerably and thus decreases their life. And finally, there are the disadvantages consequent upon the necessity for re-heating, in the apparatus, the said clip rings every time they are used.

It is the object of the present invention to obviate such difficulties as these, and accordingly we provide apparatus characterized by means whereby the clip rings may remain in position within the apparatus.

The said apparatus may incorporate various other features. For instance, provision is preferably made to bring the said clip rings together in the required manner relative to the tire beads, suitable means may be provided for the separation and removal of the cured product from the molds, and an automatic control for the fluid pressure supply to the interior of the tire may be provided.

In order that our invention may be clearly understood and readily carried into effect the same will now be described more fully with reference to the accompanying drawings in which:

Fig. 1 is a sectional elevation showing apparatus according to one embodiment of our invention;

Fig. 2 is an enlarged view of part of Fig. 1;

Fig. 3 is a part plan view, partly in section, of the said apparatus;

Fig. 4 is a detail view of part of said apparatus;

Fig. 5 is a similar view to Fig. 2 showing the apparatus open;

Fig. 6 is a sectional view on the line $a$—$a$ in Fig. 2;

Fig. 7 is a sectional elevation showing apparatus constructed according to an alternative embodiment of our invention;

Fig. 8 is a similar view to Fig. 7 showing the apparatus open.

The description hereinafter will be primarily confined, by way of exemplification, to apparatus of the kind wherein, firstly, are provided two hollow annular shells or steam chests 1 and 2 horizontally disposed, the bottom chest 1 rigid with the base structure 3 and the top chest 2 hinged at 4 in relation to the said lower chest 1; and wherein, secondly, the tire is automatically stripped from the molds, 5, 5ᵃ consequent upon the opening of the apparatus. It will be assumed that the means to achieve that end include a platform 6, hereinafter called the carrier ring, adapted to be vertically displaced by an upright link 7, connected to the lower end of a lever 7ᵃ operated by a link 7ᵇ and an arm 7ᶜ which is rigidly connected with the hinged chest 2. A certain mechanism, indicated as a whole at 8, is actuated by the displacement of the carrier ring and is adapted to collocate the movements of the clip rings 9, 9ᵃ and the hinged chest 2 to cause the stripping of the tire from the molds to be consequent upon the opening of the apparatus. The chests may be clamped together in any convenient manner; for instance, as is illustrated in Fig. 6, by cam clamps 10. The said clamping arrangement may if desired be associated with the fluid pressure supply to the interior of the tire (for instance in a manner and for the purposes set forth in our prior British Patent No. 272,992, dated June 21, 1927.)

In the preferred embodiment of the application of our invention to this kind of apparatus, one half 9 of the clip rings, one ring of the pair, is secured to the said carrier ring 6. It may be attached thereto by bolts as shown at 6ª in Fig. 2 or may be integral therewith. The other half 9ª of the clip ring is slidably anchored so as to be spring loaded, as hereinafter set forth, in or in relation to the upper mold half 5ª, being separable therefrom to a limited degree.

In opening the apparatus the top chest 2 moves upward. The clip ring 9ª therein is prevented, as hereinafter set forth, from moving upward with it by the mechanism 8 associated with the carrier ring and thus the top mold 5ª is separated from the uppermost side of the tire. Continued upward movement of the top chest causes the top clip ring 9ª to be released from restraint, and the carrier ring 6 to move upward and force the clip ring 9 and thereby the lower half of the tire from the lower mold 5. The top ring 9ª having, as hereinafter set forth, been repositioned automatically in the top mold half, the tire, resting upon the lower clip ring 9 on the carrier 6, may then be readily removed from the apparatus.

In loading and closing the apparatus a raw case, with airbag, is placed upon the lower clip ring 9 on the carrier ring and the top chest is swung down upon it. This causes both the top clip ring 9ª and the carrier ring 6 to be restrained during the initial stages of the next upward movement of the top chest.

We now proceed to describe in more detail the preferred construction and arrangement of the various features referred to.

The spring-mounting means for the top clip ring 9ª include brackets or lugs 11 upon the said clip ring, vertically disposed rods 12 anchored therein, brackets 13, rigidly attached by bolts 13ª, Fig. 3, to the top chest, through which brackets 13 the rods 12 extend, and helical compression springs 14 disposed between the said brackets 13 and nuts 12ª upon the rods 12. In the early stages of the upward travel of the top chest the top clip ring 9ª remains stationary, as hereinafter set forth. Later the said clip ring is freed, also as hereinafter set forth, and the springs push up the rods 12 and push the top clip ring once more into place in the upper mold. Preferably two of these spring supports 13 are provided diametrically opposite and so arranged in relation to the hinge of the apparatus as to accommodate most efficiently the relative movement of the top mold and the top clip ring.

The mechanism for collocating the movement of the top chest and clip ring preferably comprises spring loaded plungers or grippers 15 sliding horizontally in the upper portion of the carrier ring 6. Each said plunger is pressed outwardly by a spring 16 (Fig. 3) and is controlled by a lever 17 (Fig. 5) bifurcated to engage a pin 19 carried by the plunger 15 and sliding in a slot in the casing 18 which surrounds the plunger. The lever 17 is pivotally mounted at 20 in the carrier ring 6 and provided with cam faces 21 and 21ª adapted to co-act with opposing cam faces 22 and 22ª formed upon a key 23 rigid with the hinged chest, said key as shown in the drawings being conveniently carried by the aforesaid bracket 13. This mechanism is repeated at opposite sides, as shown in Fig. 3.

When the apparatus is closed the said plungers 15 ex end, held by their springs 16, over an inwardly extending flange 9ᵇ on the clip ring 9. In opening, as the top chest moves upward the keys 23 rigid therewith rise and the cam faces 22 coact with the cam faces 21 to swing the levers 17 about the pivots 20 to withdraw the plungers 15 to free the clip ring 9ª from restraint and thus allow the springs 14 to strip the said clip ring from the tire and reposition it in the top mold 5ª. The chest 2 is then free to be swung manually upwards fully to open the apparatus, the plungers 15 being meantime pressed outwardly again by their springs 16 as the key 23 leaves the lever 17.

In closing, the top chest 2 is lowered, and the cam faces 22ª on the keys 23 coact with the cam faces 21ª on the levers 17 so that the plungers 15 first are withdrawn, to allow the top clip ring 9ª to pass thereunder, and then are projected by their springs 16 out over the clip ring flange 9ᵇ already referred to.

It is not to be construed that we are limited to the precise details hereinbefore set forth or in general to any one particular embodiment of our invention. For instance while the difference between the travel speed of the carrier ring and the top chest occasioned by the arrangement of the linkage, may be relied upon to provide the conditions under which automatic stripping may occur, we may further provide that the said carrier ring may remain wholly stationary during the initial movements of opening. For instance we may provide lost motion in the linkage gear, as by a slot point 7ª (Fig. 1). Then, wholly to avoid the possibility of the carrier ring being pulled upward by the tire we should preferably provide a suitable detent adapted, for instance, to be actuated by one or other of the links of the linkage gear referred to or the linkage itself may be arranged to provide the necessary detent means.

Or again although the mere closing of the apparatus may in itself be sufficient to serve the same purpose as the usual elaborate clipping-up press, we may provide auxiliary means to achieve the same end independently of or augmenting the normal action of the apparatus in closing. Such means may also augment the complete clamping of the apparatus, function as initial separating means or be associated with control means for the fluid pressure supply to the interior of the tire for instance as hereinbefore set forth.

For instance, we may utilize toggle or eccentric gear such as is described in our co-pending application Serial No. 261,763 filed March 15, 1928. This is shown in Fig. 1. Upon the fixed chest 1 there is a bracket 24 upon which is hinged a handle 25. Pivoted to the said handle is a lever or link 26 which coacts with the hinged chest to exert, when the handle is actuated, the required pressure in the desired direction to open or to close the apparatus as the case may be. Preferably the said link is of girder construction being formed by two parallel plates spanned at the end remote from the pivot, by members 27 adapted to engage alternately opposite sides of a bracket 28 upon the hinged chest. The handle 25 may be branched as shown at 25$^a$ to ensure that operating provision is readily accessible at the stages of both opening and closing of the apparatus. In order that the branching shall not create obstruction preferably one or other of the branches is slidably mounted as indicated at 25$^b$. A pedal 25$^c$ may be added to facilitate actuation by foot.

Again, further to emphasize that our invention is not limited to embodiment in any one particular arrangement, in Figs. 7 and 8 and the description hereunder, we exemplify that we do not confine ourselves for instance to the type of apparatus wherein the chests are hinged relatively to each other; or again to the precise means for mounting the clip rings or to the particular means for achieving automatic stripping of the tire hereinbefore set forth.

Apparatus according to Fig. 7 and 8 includes an upper chest 29 stationary upon vertical pillars 31 being part of the frame structure of the apparatus, a lower chest 30 adapted to move against said upper chest 29 under the influence of a hydraulic ram 32, mold halves 29$^a$ and 30$^a$, clip rings 29$^b$ and 30$^b$, and a carrier ring 33, said carrier ring 33 being displaceable relative to the upper chest 29, and the lower chest 30 displaceable relative to both the upper chest and to the carrier ring as and for the purposes hereinafter set forth. One clip ring 30$^b$ is secured to the carrier ring 33. As shown in the drawings it may be attached thereto or, alternatively, integral therewith. Said carrier ring is supported upon pillars 34 anchored in a platform 35 and slidably mounted in a further platform 36 directly under the influence of the ram 32 and adapted to support the lower chest 30.

The other clip ring 29$^b$ is slidably anchored in or in relation to the upper mold half 29$^a$, being separable therefrom to a limited degree. Said clip ring 29$^b$ is carried by pillars 37, collared at 38 to be slidably anchored in bracket 39 and under the influence of springs 40 pressing downwardly.

In closing the apparatus the upward pressure of the ram 32 is transmitted through the platform 36 to the chest 30 which rises until the mold half 30$^a$ coacts with the clip ring 30$^b$ which then rises with the chest 30 until the said clip ring and the said chest coact with their counterparts to enclose the tire in the required manner.

In opening the apparatus the ram pressure is relieved and the several vertically displaceable parts proceed downwardly under the dual influence of gravity and the springs 40. The influence of the said springs being greater than the gravitational influence of the said displaceable parts, the tire is first stripped from the top mold 29$^a$. The clip ring 29$^b$ is limited in its downward movement (Fig. 8) by the collars 38. Then the lower mold 30$^a$ and the clip ring 30$^b$ together with their associated parts proceed downwardly by gravity until the platform 35 contacts with stop 31$^b$ on the frame pillars 31. Then the said lower mold 30$^a$ and its associated parts, being still unimpeded, proceed further downwardly until as shown in Fig. 8 the platform 36 contacts with the platform 35 to leave the tire, indicated at 41, positioned upon the clip ring 30$^b$ ready for removal.

It will be appreciated therefore that for the purpose of automatic stripping we are not confined to the use of the kind of mechanism shown generally at 8, Fig. 1. It will however be apparent that similar mechanism may be incorporated in apparatus of the type shown in the said Figs. 7 and 8. For instance in one arrangement as the apparatus closes, spring loaded plungers or grippers carried by the ram head are, by a cam member rigid with the top or fixed chest 29, forced outwardly against their springs over a flange of the top clip ring 29$^b$. As the apparatus opens the said plungers, moving downwardly with the ram, strip the top clip ring and top half of the tire from the mold. Continued movement downwardly of the ram is allowed by the plungers withdrawing, under the influence of their springs, as they move away from the cam member. In this arrangement of course the springs 40 may be dispensed with.

It will also be appreciated therefore that for the mounting of the loose clip ring we are not confined to any one particular arrangement, as for instance spring mounted, provided always that we meet the essential requirements, that is, that the said clip ring has a certain degree of freedom relative to its mold part.

Various other modifications may be made by those skilled in the art without departing

We claim:

1. An apparatus of the character described comprising a chest in two parts, a clip ring forming part of a mold and a complementary mold part, the clip ring and complementary mold part being separable to a limited extent and spring mechanism for attaching the clip ring to a part of the chest to permit limited movement relative thereto.

2. An apparatus of the character described comprising a chest in two complementary annular mold parts adapted to embrace the tire and a clip ring which is permanently attached to other parts of the apparatus, said clip and chest parts forming a mold for a tire, and means adapted to engage the clip ring and cause a separation of the tire from the complementary part of the mold, said means including plungers adapted to engage the clip ring upon the operation of the apparatus.

3. An apparatus of the character described comprising a chest in two annular mold parts adapted to embrace the tire and a clip ring which completes said chest and which is permanently attached to other parts of the apparatus, and spring mechanism for ensuring separation of the tire from one mold part when the apparatus is opened.

4. Apparatus of the type described which comprises a mold ring for one face of a tire, a clip ring for said mold ring, means for carrying said clip ring on said mold ring, and a spring for separating said clip ring from said mold ring.

5. Apparatus of the type described which comprises a mold ring for one face of a tire, a clip ring for said mold ring, means for carrying said clip ring on said mold ring, a spring for separating said clip ring in an axial direction from said mold ring, means for restraining the action of said spring, and means for releasing said restraining means upon the axial movement of said mold ring.

6. Apparatus of the type described which comprises a pair of tire mold rings separable on a plane at a right angle to the axes of the rings, separable clip rings forming complementary parts to said mold rings, means for opening said mold rings in an axial direction, and means for moving said clip rings from said mold rings subsequently to the separation of the latter.

7. Apparatus of the type described which comprises a pair of tire mold rings separable on a plane at a right angle to the axes of said rings, separable clip rings forming complementary parts to said mold rings, means for opening said mold rings in an axial direction, spring means for separating said clip rings from said mold rings, and releasing means for holding said clip rings to said mold rings and for releasing said spring upon the movement of said mold rings.

8. Apparatus of the type described which comprises a pair of mold rings separable on planes at a right angle to the axes of said rings, a pair of clip rings separable on a plane at a right angle to the axes of said rings, and means for separating one mold ring from the other and from its complementary clip ring, means for separating said former mold ring from its complementary clip ring, and means for separating said latter mold ring from its complementary clip ring.

9. Apparatus of the type described which comprises a pair of mold rings separable on a plane at a right angle to the axes of said rings, a pair of complementary clip rings for said mold rings separable on said plane, spring means for holding one clip ring on its respective mold ring, means for holding said clip ring against the action of said spring upon movement of said clip ring, and means for releasing said holding means upon further movement of said mold ring.

In witness whereof, we have hereunto signed our names.

HARRY WILLSHAW.
THOMAS NORCROSS.
FREDERICK GEORGE BROADBENT.